United States Patent [19]

Schilt

[11] 3,769,070
[45] Oct. 30, 1973

[54] A METHOD OF GLAZING GREENWARE WITH AN AMBIENT EPOXY RESIN CURING COMPOSITION

[76] Inventor: Stephen J. Schilt, 104 Via Palermo, Newport Beach, Calif. 92660

[22] Filed: Feb. 18, 1971

[21] Appl. No.: 116,574

[52] U.S. Cl.............. 117/94, 117/97, 117/123 D, 117/132 BE, 260/2 N, 260/18 EP, 260/30.4 EP, 260/32.8 EP, 260/33.2 EP, 260/37 EP, 260/47 EN, 260/51 EP, 260/59, 260/79, 260/91.3 VA, 117/138.8
[51] Int. Cl............................................. B44d 1/02
[58] Field of Search.................. 260/47 EP, 47 EN, 260/30.4 EP, 37 EP, 2 N, 51, 59, 91.3 VA, 79; 117/161 ZB, 123 D, 138.8, 94, 97; 106/48

[56] References Cited
UNITED STATES PATENTS 3,518,220  6/1970  Landua et al.................. 260/47 X
3,367,911  2/1968  Daum et al. ................. 260/30.4 EP
3,454,669  7/1969  Laudise .......................... 260/47 EN

OTHER PUBLICATIONS

Epoxide Resins W. Potter 1970 (p 116; 118).

Primary Examiner—William H. Short
Assistant Examiner—T. Pertilla
Attorney—Marvin E. Jacobs

[57] ABSTRACT

An ambient cure glaze composition particularly adapted for decorating and strengthening greenware comprising a flowable composition containing a reactive epoxy liquid polymer, non-volatile diluents, coloring agents and viscosity controlling agents. The flowable composition is cured and hardened by combination with a curing agent which is absent free amine groups. The composition is non-toxic and has low dermal sensitivity.

7 Claims, 4 Drawing Figures

INVENTOR.
STEPHEN J. SCHILT
BY
ATTORNEYS.

A METHOD OF GLAZING GREENWARE WITH AN AMBIENT EPOXY RESIN CURING COMPOSITION

BACKGROUND OF THE INVENTION

1. Field of the Invention

The present invention relates to the decoration of various substrates, and, more particularly, to an improved ambient temperature curing coating or glaze for applying a decorative finish to artistic and commercial objects.

2. Description of the Prior Art

Greenware is utilized to characterize a class of non-fired ceramic ware. Greenware is air dried and is vitreous, fragile and has little durability. To improve both its strength and appearance, greenware is usually fully glazed by kiln firing.

Several resinous coatings and glazes are available which are intended to eliminate or replace glazing by kiln firing. These products demonstrated many characteristics and properties which limited their commercial attractiveness. Solvent based alkyd enamels have the disadvantage common to any lacquer in that the solids must be maintained below about 25 percent by weight or the viscosity becomes excessive. Therefore, only a thin film up to about 5 mils can be applied on each pass without the film flowing unevenly. The solvent is noxious and many times is hazardous in terms of flammability and skin irritation. On solvent evaporation, bubbles can remain entrained in the film and the film may shrink and wrinkle as the solvent evaporates.

The dried film has poor surface gloss, poor durability and poor adhesion to metal. Solvent based epoxies also suffer the disadvantages common to solvent release such as low build and additionally are not compatible with decorative articles made from polystyrene foam since the solvent attacks and dissolves the surface of these articles.

Acrylic based glazes are either solvent based or require heat curing. High build films yield very poor hardness. Polyester glazes do not cure tack-free have a high oral and dermal toxicity and a low flash-point of about 88°F. The polyester glazes are not self-leveling and also attack styrene substrates.

SUMMARY OF THE INVENTION

Glazing compositions provided by this invention are easy to formulate and apply, have low oral and low dermal toxicity and high build and cure under ambient conditions to yield a high gloss, high hardness film. The composition of the invention has low odor level and a high flash point. The thick coating achievable provides a finish having the appearance of visual depth.

It has further been discovered that the inventive glaze composition is extremely versatile as a coating for decorative purposes. It develops a durable and attractive finish on a wide variety of substrates. A primary advantage and uniqueness is the ability to form a high-build, glossy glaze on clay products without the necessity of a high temperature kiln. In addition to being compatible with ceramic ware, the composition does not deleteriously affect plastic resinous substrates such as polystyrene and can be applied directly to metal substrates or polystyrene without the need for a barrier coating or primer.

The glazing composition in accordance with the invention is absent volatile solvent and essentially comprises a combination of a reactive prepolymer, reactive non-volatile diluents, inert viscosity controlling agents and a curing or hardening agent. Optionally, coloring agents which may be pigments or dyes that are compatible with the other ingredients of the composition may be present.

The invention will now become better understood by reference to the following detailed description when considered in conjunction with the accompanying drawings.

DESCRIPTION OF THE PREFERRED EMBODIMENTS

Figure 1:
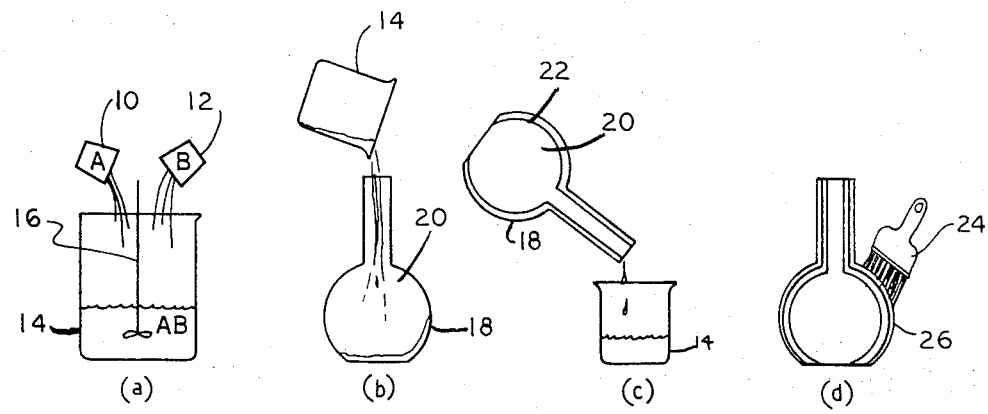
FIG. 1 is a schematic view of a series of steps practiced in glazing an article of greenware.

A main feature of this invention resides in the use of a reactive prepolymer. By reactive prepolymer is meant a liquid material having a molecular weight of from above about 200 to about 5,000 to 10,000 and having terminal reactive end chain functionality capable of catalyzed reaction to form fully cured, solid resins having a molecular weight above about 100,000. These liquid materials have a low viscosity and essentially 100 percent solids compositions can be formulated. Since the compositions do not contain solvent they can be applied to the substrate in any desired thickness.

The preferred resin forming prepolymer constituent of the composition is a polyepoxide glycidyl ether having a 1,2-epoxy equivalency greater than 1.0.

A widely used class of polyepoxides which can be catalyzed according to the practice of the present invention encompasses the resinous epoxy polyethers obtained by reacting an epihalohydrin, such as epichlorohydrin, epibromohydrin, epiiodohydrin, and the like, with either a polyhydric phenol or a polyhydric alcohol.

Among the polyhydric phenols which can be used in preparing these resinous epoxy polyethers are dihydric phenols represented by the general formula:

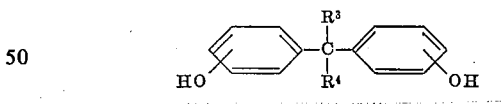

wherein the phenolic hydroxy groups may be in one of the 2,2'; 2,3'; 2,4'; 3,3'; 3,4'; or 4,4' positions on the aromatic nuclei, and each of $R^3$ and $R^4$ represent hydrogen, or alkyl group, such as methyl, ethyl, propyl, isopropyl, butyl, sec-butyl, tert.-butyl, pentyl, isopentyl, hexyl, isohexyl, and the like; a cyclo (lower)-alkyl group, such as a cyclohexyl or substituted cyclohexyl group, e.g., methyl-, ethyl-, propyl-, butyl-, pentyl- and hexyl- substituted cyclohexyl, or an aromatic group, such as phenyl, tolyl, xylyl, and the like. In addition, the phenolic rings may have other substituents besides the hydroxyl group, for example, lower alkyl groups containing from one to four carbon atoms, e.g., methyl, ethyl, propyl, isopropyl, butyl, secbutyl and tert.-butyl groups, halogen atoms, i.e., fluorine, chlorine, bromine or iodine, and the like.

An illustrative but, by no means exhaustive listing of dihydric phenols falling within this general formula includes 4,4'-dihydroxydiphenyldimethyl-methane (bisphenol A), 2,4'-dihydroxydiphenylethylmethane, 3,3'-dihydroxydiphenyldiethylmethane, 3,4'-dihydroxydiphenyl-methylpropylmethane, 2,3'-dihydroxydiphenylethylphenylmethane, 4,4'-dihydroxydiphenylpropylphenylmethane, 4,4'-dihydroxydiphenylbutylphenylmethane, 2,2'-dihydroxydiphenylditolylmethane, 4,4'-dihydroxydiphenyltolylmethylmethane, and the like.

Other polyhydric phenols which may also be coreacted with an epihalohydrin to provide these resinous epoxy polyethers are such compounds as resorcinol, hydroquinone, substituted hydroquinones, e.g., p-tert.-butylhydroquinone, and the like, indanols such as those disclosed in U.S. Pat. No. 2,754,285 to Petropoulos, and polyhydric phenols having two hydroxyl aryl groups separated by an aliphatic chain of at least six carbon atoms in length, said chain being attached by carbon-to-carbon bonding to nuclear carbon atoms of the hydroxylaryl groups. All of such glycidyl ethers have a 1,2 epoxy equivalency greater than 1, usually between 1 and 2 and can be prepared by the method described in U.S. Pat. No. 2,538,072.

Among the polyhydric alcohols which can be coreacted with an epihalohydrin to provide these resinous epoxy polyethers are such compounds as ethylene glycols, pentane diols, bis (4-hydroxycyclohexyl) dimethylmethane, 1,4-dimethylolbenzene, glycerol, 1,2,6-hexanetriol, trimethylol propane, mannitol, sorbitol, erythritol, pentaerythritol, their dimers, trimers and higher polymers, e.g. polyethylene glycols, polypropylene glycols, triglycerol, dipentaerythritol and the like, polyallyl alcohol, polyvinyl alcohol, polyhydric thioethers such as 2,2'-dihydroxydiethyl sulfide, 2,2'-,3,3'-tetrahydroxydipropyl sulfide and the like, mercapto alcohols such as α-monothioglycerol, α,α'-dithioglycerol, and the like, polyhydric alcohol partial esters such as monostearin, pentaerythritol monoacetate and the like, and halogenated polyhydric alcohols such as the monochlorohydrins of glycerol, sorbitol, pentaerythritol and the like.

Another class of polymeric polyepoxides which can be cured by means of the above-described curing agents includes the epoxy novolac resins obtained by reacting, preferably, in the presence of a basic catalyst, e.g., sodium or potassium hydroxide, an epihalohydrin such as epichlorohydrin with the resinous condensate of an aldehyde, e.g., formaldehyde, and either a monohydric phenol, e.g., phenol itself, or a polyhydric phenol e.g., bisphenol A.

Particularly preferred polyethers are the diglycidyl ethers prepared from 2,2-(bis(4-hydroxyphenyl) propane, i.e., bisphenol A. They contain a chain of alternating glyceryl and 2,2-bis(4-phenylene) propane radicals separated by intervening etheral oxygen atoms and have a 1,2-epoxy equivalency between about 1.0 and about 2.0 as well as preferably, a molecular weight of about 340 to about 1000, and an epoxide equivalent weight of about 170 to about 500. The epoxy No. or epoxy equivalent weight is the weight of glycidyl polyether per epoxide group and is most preferably between 170 and 200.

The composition is prepared in two parts since once the polyepoxide and hardening agent are mixed together, the composition will have a pot life of several minutes to several hours before it irreversibly proceeds to a hard, cured state. A 5–15 mil film cures to form a film having a Barcol hardness between about 65 and 90.

The hardening agent is preferably an amine reaction product since free amine compounds are found to be excessively toxic and have high sensitivity. A preferred class of hardening agent is a reaction product of a polyamine such as ethylene diamine, and diethylene triamine and diacetone acrylamide. A commercial product, Lubrizol CA-21, the reaction product of diacetone acrylamide and diethylene triamine is suitable.

The resin containing part of the composition also contains a reactive diluent such as a monoglycidyl ether, suitably Epoxide No. 7 (Proctor and Gamble) which is a derivative of an aliphatic glycidyl ether containing primarily n-octyl and n-decyl alkyl groups. The first part of the composition also contains a thixotropic agent, suitably an inert filler such as finely divided silica e.g., submicroscopic, pyrogenic silicas, such as Aerosil or Cabosil, to control the viscosity within the range of about 1000 cps to about 8000 cps such that the first part of the composition is readily poured for measuring and mixes with the second part to form a pourable, flowable final mixture having a viscosity from about 1000 cps to about 6000 cps.

Coloring agents can be added to either part and are compatible materials such as pigments suitably $TiO_2$, chrome yellow or molybdate orange or dyes such as anthraquinone, azoquinone, or phthalocyanine.

The second part of the formulation essentially comprises the hardening or curing agent. To avoid the need of high speed mixers and to adjust the pourability of the second part, the viscosity can be adjusted by means of nonvolatile diluents such as ketones, or ethers suitably methyl ethyl ketone, methyl isobutyl ketone, ethylene glycol butyl ether, ethylene glycol methyl ether and the like.

A representative formulation for the composition follows:

| COMPONENT A Material | Range (Pbw) | Preferred (Pbw) |
|---|---|---|
| Reactive prepolymer Resin (*Araldite 6005, Epon 828** or D.E.R. 332***) | 75–95 | 81.80 |
| Reactive Diluent Epoxide No. 7 | 5–25 | 9.00 |
| Thixotropic Agent Aerosil or Cabosil | 1–20 | 6.00 |
| Pigment Dispersion ($TiO_2$) | 0.5 to 4 | 3.20 |
| | | Total: 100.00 |
| COMPONENT B Curing Agent (Lubrizol CA-21) | 20 to 30 | 25.00 |
| Diluent | | |
| Methyl ethyl ketone | 2–4 | 3.30 |
| Ethylene glycol butyl ether | 2–4 | 3.30 |
| Ethylene glycol methyl ether | 1–2 | 1.67 |
| | | Total: 33.3 |

*Araldite 6005 (CIBA) has an epoxy No. of about 182–191 and viscosity of 7,000–10,000 cps at 25°C
**Epon 828 (Shell) has an epoxy No. of about 185–192 and viscosity of 100–160 poises at 25°C
***D.E.R. 332 (Dow) has an epoxy NO. of about 172–196 and viscosity of 4,000–5,500 cps at 25°C The ratio of resin to reactive diluent can be from 3/1 to 15/1 preferably about 9–10/1 and the ratio of resin to curing agent can be as low as 7/1 and as high as about 15/1 and still yield a satisfactory product, but is preferably about 10/1. As formulated, the ratio of Component A to Component B can vary between 4/1 to 2/1 and the optimum ratio is 3/1. Thus, the mixing ratios are not critical to obtaining a successfully finished article.

The oral toxicity of the primary components of the composition are listed in the following table.

TABLE 1

| Material | LD50 gm/kg |
|---|---|
| Araldite 6005 | 13.3 |
| Epoxide No. 7 | 10.0 |
| Lubrizol CA-21 | 7.5 |

Component A is prepared by mixing the resin and diluent, adding the inert filler and coloring agent and mixing until a homogenous dispersion is obtained. The dispersion is then placed in an air-tight container such as a resin coated metal can. Component B is prepared by intimately mixing the curing agent and diluent to form a flowable mixture and is similarly packaged.

Referring now to FIG. 1 (a), a glazing or coating composition, AB, is prepared by pouring three parts by weight of Component A from cup 10 and one part of Component B from cup 12 into beaker 14 and stirring them well together with stirrer 16 for about 5 minutes. Hand stirring with a wooden spatula is satisfactory.

The glazing composition AB has a pourable, consistency and can be flowed on or brushed on the substrate to be decorated and strengthened. The glazing composition has a pot life of several hours before it advances to a hard cured state. The combined formulation is not a toxic substance relative to ingestion or local contact, nor is it a skin irritant, strong sensitizer; corrosive material or flammable material as classified under the Federal Hazardous Substances Labeling Act. It is also absent the typical epoxy-amine odor and in total is a safe, effective and easy material to handle and work with.

The glazing composition is particularly useful with air-dried greenware. Greenware is fragile, soft and has a dull appearance. However, when coated with the ambient curing glaze composition of this invention, the impact strength, hardness and durability of the article are greatly increased and approach that of kiln fired pieces.

Referring now to FIG. 1 (b), a decorative article of greenware such as an air-dried hollow vase 18 formed from molding clay is illustrated. The molding clays are mixtures of silica and silicates readily available commercially. The vase is cleaned and smoothed to remove rough areas and seams preliminary to glazing.

To further increase strength of the greenware article, the interior may be coated as shown in FIG. 1 (b) with the composition by pouring the composition from beaker 14 into the internal cavity 20 of the vase 18 and turning the vase to move the liquid across the entire internal surface to form a film 22. When this is accomplished the vase 18 is turned sideways as shown in FIG. 1 (c) and the excess composition returned to the beaker 14. The composition will flow to form a film having a thickness from 5 to 15 mils, suitably 10 mils.

The outside surface of the greenware vase 18 is then coated as illustrated in FIG. 1 (d) by applying the composition with a brush 24 to form a film 26. A thick coating of up to 15 mils can readily be brushed on. A thicker film provides more strength and is therefore preferred to a thinly brushed film. The film is found to flow and level to obliterate the brush marks and cures after 48 hours to an attractive, glossy finish. The thickness of the colored film provides a rich attractive glaze having a deep visual effect such that the entire article appears to be colored rather than just the glaze coat. No shrinking or wrinkling of the film is evident after curing. The 15 mil film had a Barcol Hardness of 87.

Figures 2, 3:
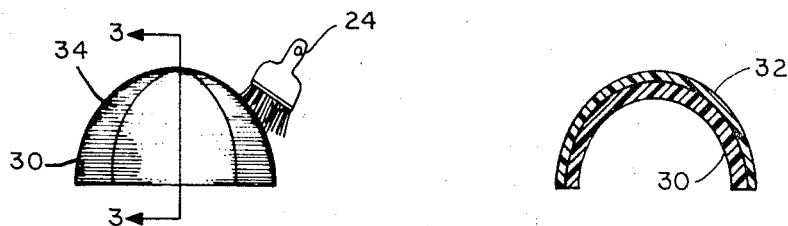
FIG. 2 is a schematic view illustrating the glazing of a polystyrene article.
FIG. 3 is a sectional view taken along the line 3—3 of FIG. 2.

Solvent susceptible substrates such as polystyrene and inert smooth substrates such as metal are difficult to coat with resins without providing an intermediate protective layer or a layer of primer. Referring now to FIGS. 2 and 3, a lampshade 30 formed from foamed polystyrene was coated by applying the glazing composition of the invention with brush 24 to form a 10 mil thick film 32. The composition does not attack the surface of the polystyrene and cures to form a hard film which strengthens and decorates the lampshade 30.

Each segment 34 of the lampshade can be coated with a differently colored glazing composition to provide a very attractive finished product. The cured film also increases the thermal resistance of the lampshade to heat absorbed from a light bulb.

Figure 4:
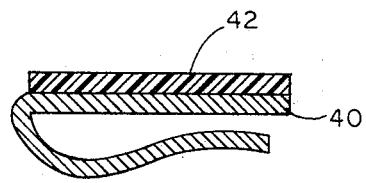
FIG. 4 is a sectional view of a decorated metal article.

Referring now to FIG. 4, a metal tie clasp 40 was coated with a 10 mil thick film 42 of the glazing composition of the invention and was found to be self-priming and forms a very strong bond with the metal substrate and dried to form a film having the appearance of a brightly colored kiln fired ceramic article.

The ambient curing glazing composition obviates the need for kiln firing of greenware and the need for barrier coating of polystyrene or priming of metals. It provides an attractive combination decorating, finishing and strengthening coating for a variety of substrates and is simple and safe to be utilized in commercial applications and by the inexperienced hobbyist.

It is to be understood that only preferred embodiments of the invention have been described and that numerous substitutions, alterations and modifications are all permissible without departing from the spirit and scope of the invention as defined in the following claims.

What is claimed is:

1. A method of strengthening and simultaneously glazing fragile, dull, soft, non-fired, air-dried, vitreous, ceramic substrates comprising the steps of:

forming a flowable, ambient curing, non-toxic, low dermal sensitivity composition absent volatile diluents, consisting essentially of in parts by weight:

75 to 95 parts of a reactive, liquid, prepolymer consisting essentially of a polyepoxide glycidyl ether having a molecular weight from 200 to 5,000, an epoxy equivalency greater than 1, curable at ambient conditions to form a fully cured solid resin having a molecular weight above about 100,000;

5–25 parts of a reactive non-volatile diluent consisting essentially of a monoglycidyl ether, the ratio of prepolymer to reactive diluent being from 3/1 to 15/1;

1–20 parts of an inert divided filler as a thixotropic agent to control the viscosity of the flowable composition between 1000–6000 cps; and a curing agent consisting of a reaction product of a polyamine and diacetone acrylamide having low toxicity and low dermal sensitivity, being capable of curing the prepolymer under ambient conditions and the ratio of prepolymer to curing agent being from 7/1 to 15/1;

applying said composition to a surface of said substrate in a single pass before cure of the composition to form a film having a thickness from about 5 mils to 15 mils; and curing said composition under ambient conditions to form a cured film having a Barcol Hardness of from 65 to 90.

2. A method according to claim 1 in which the polyepoxide is a diglycidyl ether of bisphenol A having an epoxy (No.) equivalency between about 170 and 200.

3. A method according to claim 1 in which the polyamine is selected from the group consisting of ethylene diamine and diethylene triamine.

4. A method according to claim 1 in which said substrate that is a hollow article is coated on the interior and exterior surfaces with a film of said cured composition.

5. A method according to claim 2 in which the reactive, non-volative diluent is an aliphatic monoglycidyl ether containing primarily otcyl and decyl alkyl groups.

6. A method according to claim 5, in which the filler consists of silica.

7. A method according to claim 1 in which the composition is formed of a first part consisting essentially of said prepolymer, reactive diluent and filler and a second part consisting essentially of said curing agent and non-volatile diluents selected from ketones, ethers and mixtures thereof and said parts are combined and mixed to form said curable, flowable composition.

* * * * *